United States Patent
Kwon

(10) Patent No.: US 7,898,727 B2
(45) Date of Patent: Mar. 1, 2011

(54) ELECTROPHORETIC DISPLAY DEVICE

(75) Inventor: Oh Nam Kwon, Yongin-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/654,604

(22) Filed: Dec. 24, 2009

(65) Prior Publication Data

US 2011/0026097 A1 Feb. 3, 2011

(30) Foreign Application Priority Data

Jul. 31, 2009 (KR) .................... 10-2009-0070526

(51) Int. Cl.
G02B 26/00 (2006.01)
G02F 1/133 (2006.01)
G09G 3/34 (2006.01)
G03G 13/00 (2006.01)

(52) U.S. Cl. .................... 359/296; 349/33; 345/107; 430/31

(58) Field of Classification Search ................ 359/296, 359/245, 253–254, 265, 290–291; 349/33; 345/107; 430/31–32
See application file for complete search history.

(56) References Cited

U.S. PATENT DOCUMENTS

| 6,831,770 B2* | 12/2004 | Liang et al. | 359/296 |
| 7,236,292 B2* | 6/2007 | LeCain et al. | 359/296 |
| 2007/0215377 A1* | 9/2007 | Aoki | 174/250 |
| 2009/0109172 A1* | 4/2009 | Lee et al. | 345/107 |

* cited by examiner

Primary Examiner—Scott J Sugarman
Assistant Examiner—Dawayne A Pinkney
(74) Attorney, Agent, or Firm—McKenna Long & Aldridge LLP

(57) ABSTRACT

An electrophoretic display device is disclosed. The electrophoretic display device includes a plurality of gate lines and a plurality of data lines formed to cross each other on a substrate and define a plurality of pixel regions, a plurality of thin film transistors connected to the respective gate lines and the respective data line on the substrate, an electrophoretic film disposed on the substrate and configured to contain charged particles which are driven in an electrophoresis, color filter patterns disposed on the electrophoretic film and used to realize colors, a protective film adhered with the electrophoretic film by an adhesive material and configured to protect the electrophoretic film, and a sealant formed by dispensing and hardening in a fluid phase on edges of the substrate. The protective film is configured to include an outwardly exposed portion from edges of the electrophoretic film, and a step coverage formed on the exposed portion.

4 Claims, 3 Drawing Sheets

ELECTROPHORETIC DISPLAY DEVICE

CROSS-REFERENCE TO RELATED APPLICATION

This application claims priority under 35 U.S.C. 119 to Korean Patent Application No. 10-2009-0070526, filed on Jul. 31, 2009, which is hereby incorporated by reference in its entirety.

BACKGROUND

1. Field of the Disclosure

This disclosure relates to an electrophoretic display device, and more particularly to an electrophoretic display device adapted to provide a step coverage in a part of a protective film which is adhered with electrophoretic film using an adhesive material, thereby minimizing a defect where sealant is not injected during a side sealing process.

2. Description of the Related Art

In general, electrophoretic display devices (EPDs) are flat display devices, which can display images using electrophoresis. These devices have features such as superior flexibility and portability as well as light weight. The electrophoresis allows charged particles within an electric field to move toward an anode or a cathode.

EPDs include a thin film transistor array formed on a thin base film which can be bent like paper and plastic. The EPDs drive electrophoretic drift particles using a vertical electric field between pixel and common electrodes within the thin film transistor array. Such EPDs have been anticipated as electric paper of the next generation.

FIGS. 1A and 1B are cross-sectional views showing schematically a part of a related art EPD.

As shown in FIG. 1A, a related art EPD includes a lower substrate 10 provided with a lower electrode (not shown), an upper substrate 12 provided with an upper electrode (not shown), and an electrophoretic film 14 provided with electrophoretic drift particles (not shown) and interposed between the lower and upper substrates 10 and 12. The electrophoretic drift particles are driven by an electric field induced between the lower and upper electrodes.

The EPDs further includes a sealant 16 formed between the lower and upper substrates 10 and 12. The sealant 16 prevents moisture from intruding into the electrophoretic film 14. The sealant 16 is formed through a process of dispensing a fluid sealant 16a on the lower substrate 10 using a dispenser shown in FIG. 1B, and allowing the fluid sealant 16a to flow along a positive direction D1 by a tensile force between the electrophoretic film 14 and the upper substrate 12.

The electrophoretic film 14 is configured to include a plurality of capsules (not shown) each containing charged pigment particles (not shown). Each of the capsules is configured to contain black pigment particles (not shown) reacting to a positive polarity voltage, white pigment particles (not shown) reacting to a negative polarity voltage, and solvent (not shown).

Moreover, the EPD can include a protective film 20 attached to the electrophoretic film 14 using an adhesive material. The protective film 20 protects the spheric capsules within the electrophoretic film 14 and prevents them from moving. A total thickness of the electrophoretic film 14 and the adhesive material may correspond to about 196 μm.

Such a related art EPD applies voltages to the lower and upper electrodes opposite to each other and induces a voltage difference between these electrodes. In accordance therewith, charged black and white pigment particles move toward opposite polarity electrodes, so that an image colored in black and white is viewed from users.

Recently, EPDs employ a color filter array so as to realize a variety of colors. More specifically, EPDs with the color filter array is configured to further include color filter patterns formed on the electrophoretic film 14.

The electrophoretic film of the color EPD can be formed to have the same thickness as that of the normal EPD without the color filter patterns. In this case, a displacement difference (or deviation) is generated between the black and white particles included in the electrophoretic film when the black and white particles are driven. The displacement difference (or deviation) can cause an undesired image to be viewed from an user at the side direction of the EPD.

To address the generation of the displacement difference, the electrophoretic film included in the color EPD is formed to have a minimized thickness. Actually, the electrophoretic film of the color EPD has a thickness of about 60 The color EPD with the electrophoretic film of such a thickness can prevent the generation of the above displacement difference (or deviation).

However, the thinned electrophoretic film causes step coverage in a protective film or a substrate, which is adhered to it, to be lowered. Moreover, the step coverage in the protective film or the substrate can lose uniformity due to fine alien substances attached to the protective film or the substrate. As such, a non-injection defect of sealant is caused during a process of forming a seal pattern on the outer-circumferential surface of the electrophoretic film.

BRIEF SUMMARY

Accordingly, the present embodiments are directed to an EPD that substantially obviates one or more of problems due to the limitations and disadvantages of the related art.

An object of the present embodiments is to provide an EPD that is adapted to include color filter patterns and realize desired images.

Another object of the present embodiments is to provide an EPD that is adapted to provide a step coverage in a part of the protective film which is adhered with electrophoretic film using an adhesive material, thereby minimizing a defect where sealant is not injected during a side sealing process.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the present embodiment, an EPD includes: a plurality of gate lines and a plurality of data lines formed to cross each other on a substrate and define a plurality of pixel regions; a plurality of thin film transistors connected to the respective gate lines and the respective data line on the substrate; an electrophoretic film disposed on the substrate and configured to contain charged particles which are driven in an electrophoresis; color filter patterns disposed on the electrophoretic film and used to realize colors; a protective film adhered with the electrophoretic film by an adhesive material and configured to protect the electrophoretic film; and a sealant formed by dispensing and hardening in a fluid phase on edges of the substrate. The protective film is configured to include an outwardly exposed portion from edges of the electrophoretic film, and a step coverage formed on the exposed portion.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

Figure 1A:
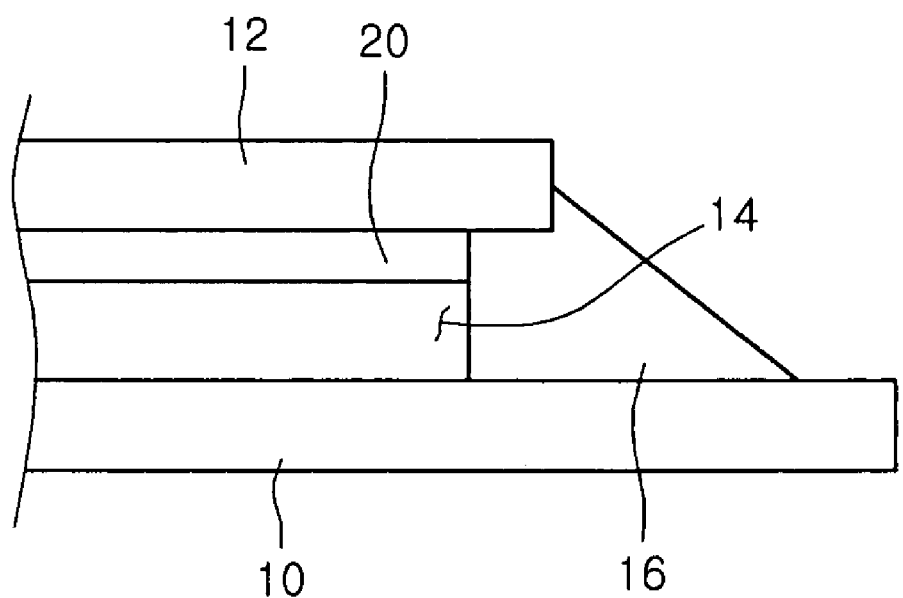
FIGS. 1A and 1B are cross-sectional views showing schematically a part of a related art EPD.
Figure 1B:
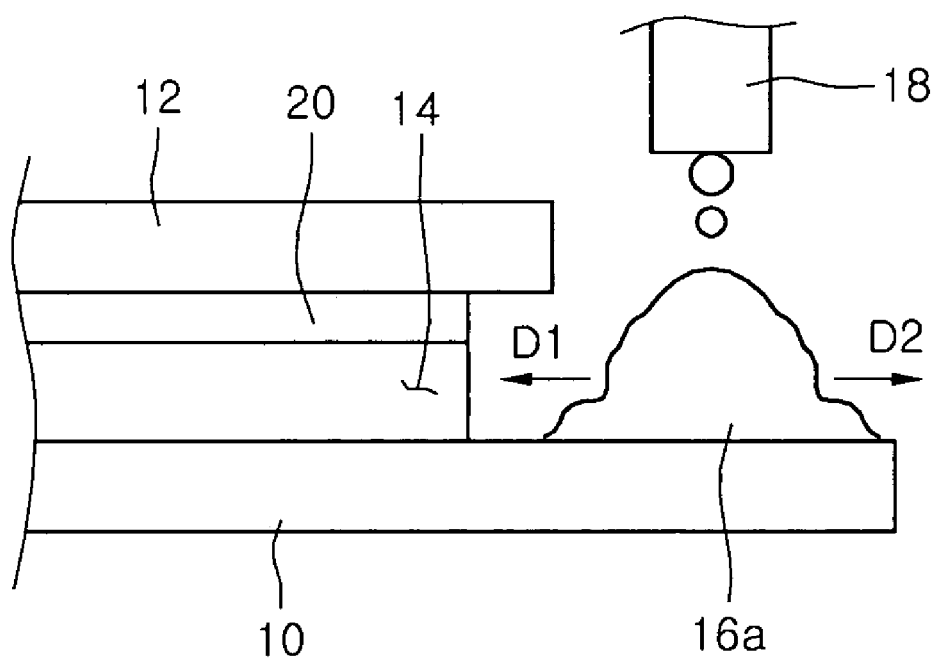

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

Figure 2:
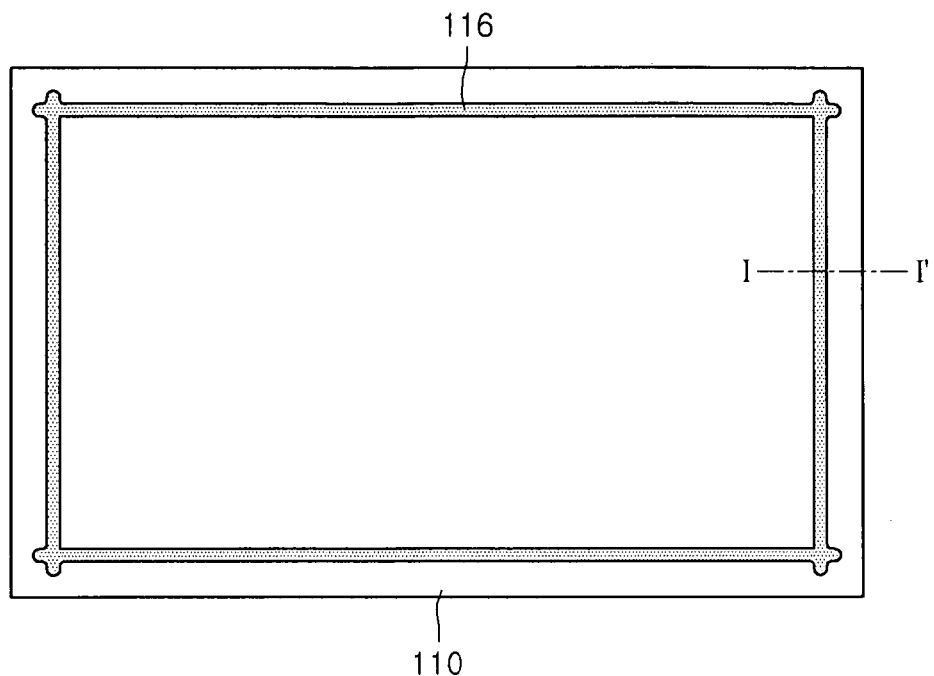
FIG. 2 is a planar view showing schematically an EPD according to an embodiment of the present disclosure.
Figure 3:
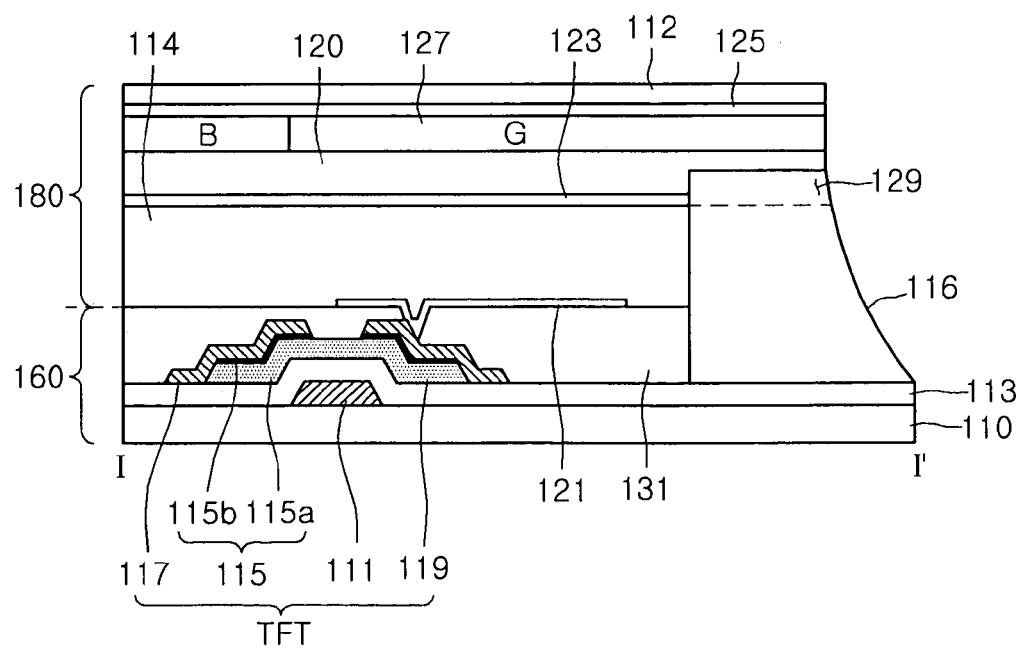
FIG. 3 is a cross-sectional view showing an EPD taken along a line I-I' of FIG. 2.

FIG. 2 is a planar view showing schematically an EPD according to an embodiment of the present disclosure. FIG. 3 is a cross-sectional view showing an EPD taken along a line I-I' of FIG. 2. Referring to FIGS. 2 and 3, an EPD according to an embodiment of the present disclosure includes a lower array unit 160 and an upper array unit 180.

The lower array unit 160 includes gate and data lines (not shown) formed to cross each other in the center of a gate insulation film 113 on a lower substrate 110, a thin film transistor TFT formed at each intersection of the gate and data lines, and a pixel electrode 121 formed on each cell region which is defined by the crossing gate and data lines. The lower substrate 110 may be formed of one material among a flexible plastic, an easily bendable base film, a flexible metal, and the like.

The thin film transistor TFT includes a gate electrode 111 receiving a gate voltage, a source electrode 117 connected to the data line, a drain electrode 119 connected to the pixel electrode 121, and an active layer 115a formed to overlap the gate electrode 111 and form a channel between the source and drain electrodes 117 and 119. The active layer 115a is formed to partially overlap the source electrode 117 and the drain electrode 119 in order to form the channel. The thin film transistor TFT further includes an ohmic contact layer 115b formed on the active layer 115a. The ohmic contact layer 115b comes in ohmic contact with the source electrode 117 and the drain electrode 119. The ohmic contact layer 115b together with the active layer 115a may configure a commercial semiconductor pattern 115.

The pixel electrode 121 electrically contacts the drain electrode 119 through a contact hole. The contact hole penetrates through a passivation (or protective) layer 131 and exposes the drain electrode 119. The passivation layer 131 protects the thin film transistor TFT.

The upper array unit 180 includes color filter patterns 127 and a protective film 120 formed on lower surfaces of the color filter patterns 127, and an electrophoretic film 114 disposed under the protective film 120. The upper array unit 180 can further include a common electrode (not shown).

The electrophoretic film 114 is configured to include a plurality of capsules (not shown) each containing charged pigment particles. Each of the capsules is configured to contain black pigment particles (not shown) reacting to a positive polarity voltage, white pigment particles (not shown) reacting to a negative polarity voltage, and solvent (not shown).

The protective film 120 protects the spheric capsules and prevents them from moving. Also, the protective film 120 is adhered with the electrophoretic film 114 by an adhesive material 123. Furthermore, the protective film 120 includes a step coverage 129 formed on an outwardly exposed portion from the outer-circumferential surface of the electrophoretic film 114.

The EPD further includes a sealant 116 interposed between the lower and upper array units 160 and 180. The sealant 116 prevents moisture from intruding into the inside of the EPD. The sealant 116 is formed through a dispensing process of dispensing a fluid sealant 116a at a designated location (i.e., the edges) on the sealant formation region of the lower array unit 160 using a dispenser, and a hardening process of curing the fluid sealant.

The EPD with such a configuration applies voltages to the pixel electrode 121 and the common electrode (not shown) opposite to each other and induces a voltage difference between these electrodes. In accordance therewith, charged pigment particles move toward opposite polarity electrodes, so that an color image is viewed from users.

The electrophoretic film 114 is adhered with the protective film 120 by the adhesive material 123, as described above. The protective film 120 is larger than the electrophoretic film 114. As such, the protective film 120 is exposed outwardly from the left and/or right outer-circumferential surface of the electrophoretic film 114. The protective film 120 is configured to include a step coverage 129 formed on the exposed portion. The exposed portion of the protective film 120 provided with the step coverage has a thickness different from that of the rest protective film 120. More specifically, the exposed portion of the protective film 120 provided with the step coverage129 has a smaller thickness compared to the rest of the protective film 120 without the step coverage 129. The step coverage 129 can be formed by mold-pressing the exposed portion of the protective film 120 which extends outwardly from the left and/or right outer-circumferential surface of the electrophoretic film 114. In accordance therewith, the sealant 116 is formed on the exposed portion of the protective film 120 with the step coverage 129.

Figure 4:
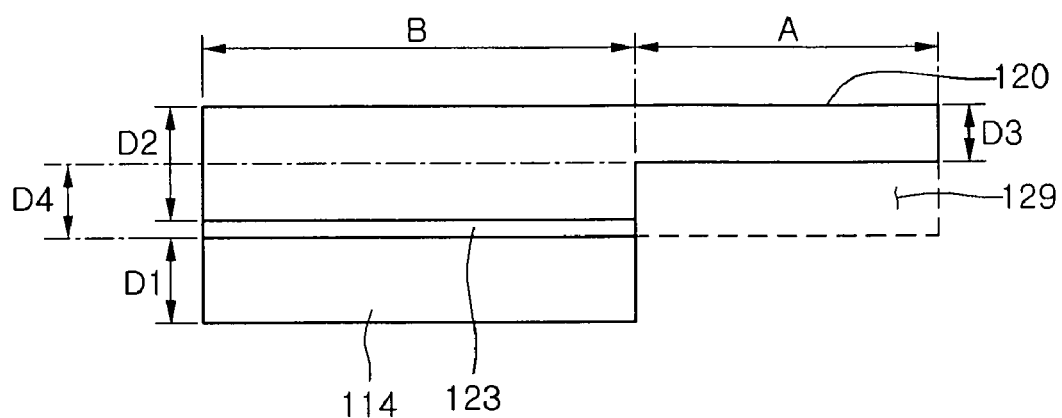
FIG. 4 is a cross-sectional view showing protective and electrophoretic films adhered by an adhesive material shown in FIG. 3.

FIG. 4 is a cross-sectional view showing protective and electrophoretic films adhered by an adhesive material shown in FIG. 3.

As shown in FIGS. 3 and 4, the protective film 120 adhered with the electrophoretic film by the adhesive material 123 provided with the step coverage 129 is formed on the outwardly exposed portion A from the right outer-circumferential surface of the electrophoretic film 114. The step coverage 129 can be formed by partially cutting off both the adhesive material 123 and the protective film 120 through a mold press process.

The EPD of the present embodiment realizes a variety of colors. As such, the thickness of the electrophoretic film 114 becomes thinner than that of the electrophoretic film included in the related art EPD which is unable to implement a color image. For example, if an electrophoretic film of the related art has a thickness of about 171 μm, the electrophoretic film 114 of the present embodiment may be made with a thickness D1 of about 60 μm.

The thinner electrophoretic film 114 prevents the generation of a displacement difference (or deviation) when a color image is displayed. As such, the picture quality of the EPD can be enhanced. On the other hand, a non-injection defect of a sealant to the outer-circumferential surface is caused.

To address this matter, the step coverage 129 is formed on the outwardly exposed portion A of the protective film 120 from the right outer-circumferential surface of the electrophoretic film 114, thereby preventing the sealant from not being injected to the right outer-circumferential surface of the electrophoretic film 114. In this case, the adhesive material 123 is not coated on the exposed portion A of the protective film 120. Moreover, the step coverage 129 can be formed in an inwardly recessed shape or in an inwardly inclined shape which goes from the right outer-circumferential surface of the electrophoretic film 114 to the inner side of the protective film 120.

The exposed portion A of the protective film 120 which is lowered inwardly in a thickness direction due to the step coverage 129 has a thickness D3 of about 255 μm. The thickness D2 of the rest B of the protective film 120 without the exposed portion A becomes about 280 μm. The thickness of the adhesive material 123 is about 25 μm. Accordingly, the height D4 of the step coverage 129 becomes about 50 μm corresponding to a sum value which adds the thickness of the adhesive material 123 to a subtraction value which subtracts the thickness D3 of the exposed portion A from the thickness D2 of the rest B of the protective film 120. Moreover, the thickness of the adhesive material 123 and the thickness of the exposed portion A of the protective film 120 can be adjusted according to the design specifications of the EDD. As such, the step coverage 129 can be formed to have a height range of about 40~140 μm.

A distance between the exposed portion A of the protective film 120 and the lower array unit (160 in FIG. 3) which is placed under the electrophoretic film 114 becomes about 110 μm. The exposed portion A of the protective film 120 which is extended to the right direction of the electrophoretic film 114 has a width of about 0.7~1.4 mm. As such, a top portion of the sealant 116 side-sealed on the exposed portion A of the protective film 120 also has a width of about 0.7~1.4 mm.

If the distance between the lower array unit 160 and the protective film 120 with the step coverage, i.e., the height of the side-sealed sealant 116, becomes 100 μm or more, the non-injection defect of the sealant 116 formed on the exposed portion A of the protective film 120 can be prevented. More specifically, the distance between the lower array unit 160 and the protective film 120 with the step coverage is above 100 100 μm, the process of side-sealing the sealant 116 is not affected by alien substances attached on the protective film 120 and the lower array unit 160. Accordingly, the non-injection defect of the sealant 116 can be prevented.

As described above, the EPD according to an embodiment of the present disclosure, which includes color filter patterns for realizing colors, is provided with a constant step coverage in a part of the protective film extending outwardly from the edges of the electrophoretic film, thereby allowing the exposed portion of the protective film to become thinner. As such, the distance between the protective film and the lower array unit is enlarged in above 100 μm. Therefore, the non-injection defect of a sealant caused in the side-sealing process of forming the seal pattern on the exposed portion of the protective film can be prevented (or minimized). As a result, the reliability of the EPD can be enhanced.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electrophoretic display device comprising:
    a plurality of gate lines and a plurality of data lines formed to cross each other on a substrate and define a plurality of pixel regions;
    a plurality of thin film transistors connected to the respective gate lines and the respective data line on the substrate;
    an electrophoretic film disposed on the substrate and configured to contain charged particles which are driven in an electrophoresis;
    color filter patterns disposed on the electrophoretic film and used to realize colors;
    a protective film adhered with the electrophoretic film by an adhesive material and configured to protect the electrophoretic film; and
    a sealant formed by dispensing and hardening in a fluid phase on edges of the substrate,
    wherein the protective film is configured to include an outwardly exposed portion from edges of the electrophoretic film, and a step coverage formed on the exposed portion,
    wherein the exposed portion provided with the step coverage is formed thinner than the rest of the protective film,
    wherein the step coverage is formed to have a height range of about 40~140 μm,
    wherein the exposed portion is formed in an inwardly inclined shape toward an inner side of the protective film.

2. The electrophoretic display device claimed as claim 1, wherein the electrophoretic film is formed to have a thickness of about 60 μm.

3. The electrophoretic display device claimed as claim 1, wherein the exposed portion of the protective film with the step coverage is formed to maintain a distance of above 100 μm from the substrate on which the sealant is formed.

4. The electrophoretic display device claimed as claim 1, wherein the exposed portion is formed in an inwardly recessed shape toward an inner side of the protective film.

* * * * *